July 24, 1928.
E. SLADE
BRAKE LINING
Filed Dec. 7, 1922
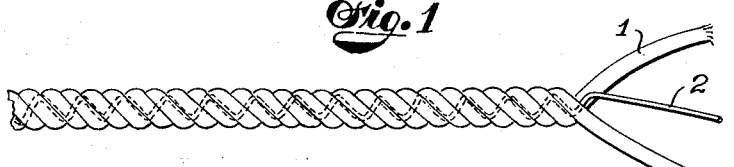
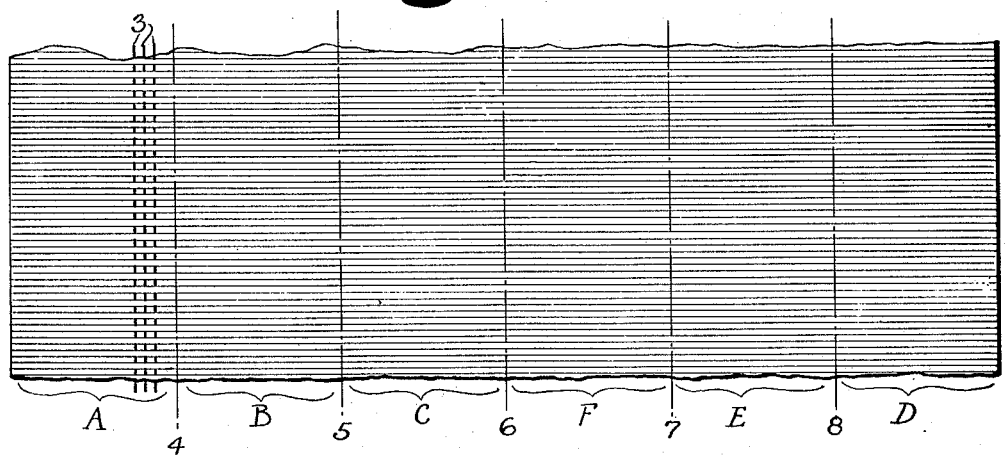
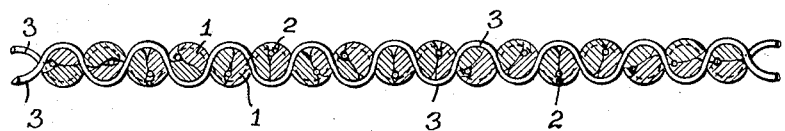
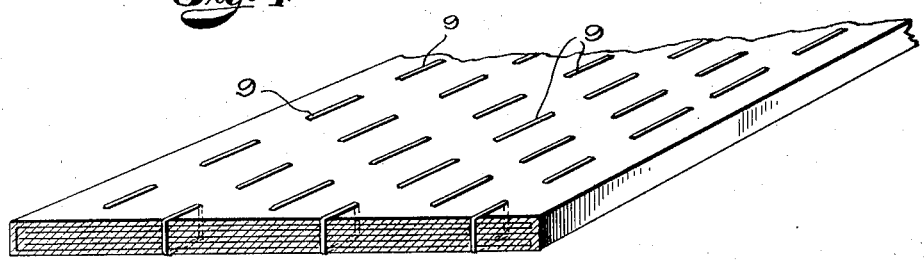

Patented July 24, 1928.

1,678,305

UNITED STATES PATENT OFFICE.

EDWARD SLADE, OF NEW YORK, N. Y.

BRAKE LINING.

Application filed December 7, 1922. Serial No. 605,524.

My invention relates to a brake lining and a method of making the same, although my product may obviously be used for a number of other purposes where it is desirable to secure a friction surface of the character described.

My invention aims to produce a lining of this type which shall be long wearing, have a higher coefficient of friction, be water and oil proof, and will not squeak, chatter or burn, as well as being non-gumming and odorless under high heat.

It is well recognized in the art that a metal to metal contact produces a very efficient braking arrangement, as for instance in the brakes of car wheels, and recognizing this principle it has been attempted heretofore to incorporate metal in brake linings used in connection with motor vehicles. Such attempts, however, resulted usually in a chattering or squeaking brake, and the amount of metal used in practice has therefore been inconsiderable. In the brake lining of my invention, however, I am enabled to produce a fabric having as high as forty five per cent (45%) metal as against fifty five per cent (55%) of asbestos or other fibrous material. Use of the impregnating ingredients in the brake lining of my invention contributes to my ability to use such a relatively large quantity of metal, and in the process of manufacture I am enabled to thoroughly impregnate the brake lining with a heat resisting, non-odoriferous lubricating compound. This, together with the compacting and other treatments to which the brake lining is subjected, as will be described hereafter, makes the brake lining of my invention a substantially homogeneous mass of asbestos yarn and bronze wire, having no voids and being capable of uniform wear over the entire surface and having long life.

It has heretofore been the practice in the manufacture of brake linings made up of a plurality of thicknesses of fabric, to coat the fabric with a compound containing rubber and vulcanize the fabric after folding to form and hold it in its final shape. By the use of my improved method of stapling the several thicknesses of fabric together, as will be described hereafter, I am enabled to dispense with the use of a vulcanizable compound and to overcome its defects, so that the brake lining of my invention is heat resistant to a far greater degree than a vulcanized lining, and on heating gives off no unpleasant odors such as are experienced when rubber is used. Because of the use of the stapling, as described, use of an adhesive such as vulcanized rubber is unnecessary, and the sticking of the brake lining to the brake drum under the influence of heat, sometimes called "freezing" is avoided.

In the drawings which accompany the specification I have shown:

In Fig. 1, a view of the asbestos and wire yarn from which my improved lining may be made, In Fig. 2, a diagram illustrating the method of folding the lining, In Fig. 3, a sectional view of one thickness of the lining, and In Fig. 4, a perspective view of the assembled and completed lining.

While my improved lining may be made of a variety of wire inserted cloths, I prefer to use a cloth composed of a hard twisted asbestos yarn 1, containing as little cotton as is practicable and twisted to form as hard and compact a yarn as it is possible to make. Two or more of such asbestos strands are wound into a strand with a bronze wire 2, as shown in Fig. 1, the location of the wire being more or less haphazard, as indicated in the section shown in Fig. 3, and the strand thus formed forms the weft strand of the fabric.

The warp strands 3 are preferably of bronze wire and the fabric is so woven that the warp strands are bent about the weft strands as indicated in Fig. 3 bringing the weft strands as close as possible together and at the same time exerting through the warp wires a clamping or holding action upon the fibres of the weft, without substantially penetrating the weft, because of the hard twisted character of the weft strands.

The fabric thus formed is cut into suitable widths and is then thoroughly impregnated with a compound, preferably containing graphite or other lubricant and a filler in a suitable liquid vehicle. This impregnation is preferably performed under pressure, so that the fabric or cloth will absorb throughout its entire thickness a substantially uniform amount of the compound. It is then heated to drive off a portion of the volatile ingredients of the impregnating compound and is folded as indicated in Fig. 2 on the lines 4, 5, 6, 7 and 8. In folding the fabric care is taken not to expose any raw edges and to this end the section "A" is folded on the line 4 so that it overlaps the section "B"; the two sections are then folded on the line 5 to overlap the section "C"; the section "D" is folded on the line 8 to overlap the section "E"; the section "E" is folded on the line 7 to overlap the section "F"; and a final fold is made along the line 6, producing a lining of substantially the correct width. The manner of folding may of course be varied to secure a lining having the desired thickness or number of plies. It is however desirable in all cases to so fold the lining that the raw edges are turned in and not exposed at the edge of the finished brake lining. The folded lining is then subjected to the action of a high pressure squaring machine, bringing it to roughly its final form, and the several thicknesses are then bound together by being stapled. While such staple material may be fibrous, I prefer to use wire in the form of staples 9, as illustrated in Fig. 4, such staples being arranged so that their open ends are clinched into the wearing surface of the brake lining. The arrangement of the staples in this relation to the wearing surface of the lining results in the ends of the staples being worn off by the continued friction of the brake drum and being burred thereby so that the staple loses substantially none of its binding quality. In this connection it should also be noted that any exposed wires on the surface of the lining are also worn off and burred into the lining and also result in retaining the strands of the fabric in their proper relative positions and thus maintaining the homogeneity of the lining.

After stapling, the lining is again squared and compressed, thus bringing it very closely to final dimensions, and is then heat treated to drive off the volatile constituents of the impregnating compound and to bring the compound to the proper consistency and hardness. There is thus left in the fabric a lubricant comprising graphite and also a filler which tends to fill the interstices of the fabric and which by being heated has been hardened to a point which will present the greatest resistance to wear compatible with the flexibility of the lining. As stated above, I prefer to use no rubber in the impregnating compound, and this final heat treatment, no rubber being used, is not a vulcanizing treatment. The lining is then finally squared under great pressure to bring it to its exact shape and size.

It will be noted that due to the presence of the wire in the brake lining and to the consistency of the impregnating compound, the brake lining will retain the shape into which it is compressed and will not spring back after pressure is removed, as would be the case if a purely fibrous material were used. It is therefore possible to make a product which can be formed to very exact dimensions and one which has an exact and uniform size throughout, for this reason, in use, my improved lining will wear uniformly throughout its entire surface and will exert substantially the same degree of friction irrespective of the extent to which it is worn. The impregnating compound, having been forced into the fibrous content of the fabric under pressure before the brake lining is built up, lubrication to the same degree exists at all times throughout the life of the brake lining and the lining remains impervious to oil and moisture and will therefore not change its shape under the conditions of use, thus obviating irregular brake control and drag.

A number of other advantages will be apparent to those skilled in the art.

I do not intend to confine myself to the particular details of the material or process described, since it will be obvious that many changes may be made without departing from my invention.

What I claim is:

1. A friction lining comprising a laminated fabric including a weft of strands of fibrous material and wire and a warp of strands of wire alone, and staples extending through and securing the laminations together, the latter strands and the staples extending longitudinally of the line of strain on the lining.

2. A friction lining comprising a laminated fabric including a weft of strands of fibrous material and wire and a warp of strands of wire alone, and staples extending through and securing the laminations together, the latter strands and the staples longitudinal of the line of strain of the lining and the ends of the staples being bent inwardly toward each other in said line of strain.

In testimony whereof, I have signed my name to this specification this 6th day of December, 1922.

EDWARD SLADE.